(12) United States Patent
Hjelm et al.

(10) Patent No.: US 7,827,073 B2
(45) Date of Patent: Nov. 2, 2010

(54) TRUSTED AUCTIONS

(75) Inventors: Johan Hjelm, Tokyo (JP); Theo Gerrit Kanter, Rönninge (SE); Mattias Lidström, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 9 days.

(21) Appl. No.: 12/243,351

(22) Filed: Oct. 1, 2008

(65) Prior Publication Data

US 2010/0082446 A1 Apr. 1, 2010

(51) Int. Cl.
*G06Q 30/00* (2006.01)
(52) U.S. Cl. ....................................................... 705/26
(58) Field of Classification Search .................. 705/26, 705/27
See application file for complete search history.

(56) References Cited

U.S. PATENT DOCUMENTS 6,101,484 A * 8/2000 Halbert et al. ................ 705/26

2005/0154639 A1 * 7/2005 Zetmeir ........................ 705/14

OTHER PUBLICATIONS

Jordi Sabater et al. "Reputation and Social Network Analysis in Multi-Agent Systems", Proceedings of the first international conference on Autonomous Agents and multiagent systems: part 1, 2002, pp. 475-482. ISBN: 1-58113-480-0.*

* cited by examiner

*Primary Examiner*—Naeem Haq

(57) ABSTRACT

Embodiments for method and a system for an on online auction system involving a computer server is closed. Values representing a relationship between a seller and a plurality of bidders are determined based on social connections of the seller and social connections of the bidders. An auction method is selected based on the values representing a relationship between the seller and the bidders. The selected auction method is performed for the purpose of selling an item of the seller at a winning bid quoted by any of the bidders.

2 Claims, 3 Drawing Sheets

TRUSTED AUCTIONS

TECHNICAL FIELD

The invention relates to a method and a system from providing an online auction platform.

BACKGROUND ART

An auction is a process of buying and selling goods or services, which includes tangible and intangible assets that are referred to as "items", by offering them up for a bid, taking bids and then selling the items(s) to a winning bidder. An auction may refer to any mechanism or set of trading rules for exchange of an item.

In this context, a "seller" is referred to as the person or organization that is offering the auctioned item and a "bidder"is referred to as the person or organization that places a bid. The winning bidder is often called a buyer as in return for the item money or any other item is given to the seller. Of course, the winning bid, i.e. the price which is offered in return for the auctioned item, may be any tangible, e.g. paper money, or intangible item of value which includes various services.

U.S. Pat. No. 3,581,072 describes an early computer driven auction-matching system for goods. This reference discloses an pricing system where priced orders to buy are arranged in descending order by price and priced orders to sell are also arranged in descending order by price within each price range, with all orders being arranged in descending order by time of placement so the older orders are upper most. Further, all compatibility prices orders are then matched starting with the highest price order to buy and the lowest price order to sell and proceeding sequentially until all compatibility priced pairs of orders have been matched. Ordering and matching types of actions are performed efficiently by computers with the outcome being controlled by pre-stored rule sets which designates the variable (the price) to be optimized.

Today several auction platforms are available on the Internet, e.g. via Ebay, Yahoo, Amazon and Bid.com. These online auction platforms in fact have no similarity with the traditional auctions in which an auction items is announced for bidding in front of a group of bidders in real time. These online auction sites act more or less as a broker that lists all kinds of auctions items for bidding for a fixed period of time. The broker takes a cut from the bidding price after one of the auction items is sold.

There are a number of disadvantages in such online auctions. First, there are no more person-to-person interactions, everything is done through a proxy server, i.e. the broker server, lacking a convenient possibility for the seller and a bidder to meet and establish trust for ensuring that the bidder is serious. Second, often an auction item could not be appreciated by the bidder and it is possible that the items is worth less than it appears to be worth.

As a result, online auctions are prone to fraud, in particularly when the social distance between the seller and the bidder is large, i.e. a person will most likely not defraud know persons while unknown persona re more likely to be subjected to fraud. Hence, today a challenge lies in implementing an online auction system which reduces the risk of fraud by taking a social distance between a seller and a bidder into account.

SUMMARY

In view of the foregoing, it is an object of the invention to provide an improvement of the above techniques and prior art. More particularly, it is an object to provide a computer-implemented method and a system for an auction mechanism that takes sellers and bidders social relationship into account when an auction is to be conducted, for reducing the risk of fraud.

Hence a method for an online auction system is disclosed. The method is performed on at least one computer server and comprises the steps of: determining values representing a relationship between a seller and a plurality of bidders, based on social connections of the seller and social connection of the bidders; selecting an auction method based on the values representing a relationship between the seller and the bidders; and performing the selected auction method, for purpose of selling an item of the seller at a winning bid quoted by any of the bidders.

The inventive method is advantageous in that a social relationship between the seller and bidders is determined. For computational reason, the relationship is represented by values or measures. Preferably a respective value represents the relationship between the seller and each bidder. When the relationship is established it is determined how socially close the seller and the bidders are, and a suitable auction method is selected in dependence of the social closeness. Once the auction method is selected the auction is performed accordingly, i.e. independence of the mechanism (rules) of the specific type of auction that is selected.

For example, to reduce the risk of fraud, a reverse-call (Dutch) auction may be used when the social relationship between the seller and bidders is close, while an open-call auction may be used when the social relationship is small or insignificant.

In this context, "social connections" are ties or bonds a person has with other persons. A person may in this case be a physical person but may be any other juridical person, such as a company or a government organization. Examples of connections are friendship relations, business relations, family relations, references, web-page links, common ideas or values etc. "Social relationship" of two persons is preferably represented by a calculated metric of the connection(s) between the two persons.

It should be noted that a "a plurality of" means more than one, and that the "winning bid" is the price (money, a service etc.) that the winning bidder should pay or compensate to the seller when the auction is successfully finished.

The method may further comprise the step of determining, based on the values representing a relationship between the seller and the bidders, which bidders are allowed to participate in the performed auction method.

This means that any person which has a weak social relationship with the seller may be excluded from the auction, which, from the sellers perspective, reduces the risk of fraud. Exclusion of a bidder may also be used when no social relationship at all may be determined between the seller and the bidder, e.g. when calculated social connection metrics are missing.

The step of performing the selected auction method may comprise: determining a value representing a relationship between the seller and a further bidder, based on the social connection of the seller and social connections of the further bidder; and allowing or denying the further bidder to participate in the performing of the selected auction method, based on the value representing a relationship between the seller and the further bidder. This is advantageous in that new bidders may join an ongoing auction while still an increased risk of fraud may be reduced.

At least a part of the social connections may be retrieved from a social network, which provides a highly feasible solution which may use more or less standard implementation methods for determining a social relationship as well as for structuring the social connections. In this context, a social network also includes, for example, networks like business networks, medical networks, science networks, data networks, communication networks and political networks.

At least a part of the social connections may be retrieved from a topological graph, which again provides for the use more or less standard implementation methods for determining a social relationship.

The social connections may comprise presence enabled data which typically shows a persons availability for communication, which may be derived from an internet protocol multimedia presence system where the communication availability is registered is a database and made accessible to others. In this context availability may be connected to other persons corresponding availability, and the social connections here comprise ties between persons communication availability (available, off-line, on a meeting, traveling etc.).

The method may further comprise the step of updating the social connections of the seller and the social connections of a bidder winning the auction, in dependence of an outcome of a transaction between the seller and the winning bidder, which further reduces the risk of fraud as it is more easy to track persons attempting to fraud other persons. Reversely, it is possible to build trust over the time so as to allow a bidder to qualify for a subsequent auction requiring high-trust, optionally even if the social relationship per se is not close enough.

The step of determining the values representing a relationship between the seller and the bidders may comprise determining the number of common social contacts, which provides for an efficient way of implementing the determining of the social relationship.

The step of determining the values representing a relationship between the seller and the bidders may comprise determining distances between a node of the social connections of the seller and nodes of the social connections of the bidders, which further provides for an efficient way of implementing the determining of the relationship. Here, distance is a calculated metric that defines a relationship between two nodes that are connected via one or more ties connections. Typically the metric is dependent on the ties and includes all types of metrics common within the field of network analysis.

The step of selecting the auction method may comprise selecting the auction method in dependence of presence of any of the bidders, optionally also in dependence of the presence of the seller. This is beneficial in that presence may be used as a way to determine the auction mechanism. e.g. it may then be that when a person is not online, i.e. not present, and has low trust in the other participants, the auction should be delayed until the person is available, or the auction should be continued but in a different form using another auction principle.

The step of determining values representing a relationship between the seller and the plurality of bidders may be preceded by the steps of: sending, to an auction server from a client associated with the seller, social connections of the seller; and sending, to the auction server from a plurality of clients associated with the plurality of bidders, social connections of the bidders. By doing this, the social connections may be updated by different applications, for in the future e.g. ensuring a more reliable calculation of social relationships.

According to another aspect of the invention, and online auctions system is described, the system being configures to: determine values representing a relationship between a seller and a plurality of bidders, based on social connections of the seller and social connections of the bidders; select an auction method based on the values representing a relationship between the seller and the bidders; and perform the selected auction method, for purpose of selling an item of the seller at a winning bid quoted by any of the bidders.

According to yet another aspect of the invention a computer readable medium is provided having stored thereon a computer program having software instructions which when run on a computer server in an online action system cause the server to perform the steps of: determining values representing a relationship between a seller and a plurality of bidders, based on social connections of the seller and social connections of the bidders; selecting an auction method based on the values representing a relationship between the seller and the bidders; and performing the selected auction method, for purpose of selling an item of the seller at a winning bid quoted by any of the bidders.

the inventive system and computer readable medium may, as described, comprise, be configures to execute and/or having stored software instructions for performing any of the features described above in association with the inventive method, as has the corresponding advantages.

BRIEF DESCRIPTION OF THE DRAWINGS

Embodiments of the invention will now be described, by the way of example, with reference to the accompanying schematic drawings, in which.

DETAILED DESCRIPTION OF PREFERRED EMBODIMENTS OF THE INVENTION

Figure 1:
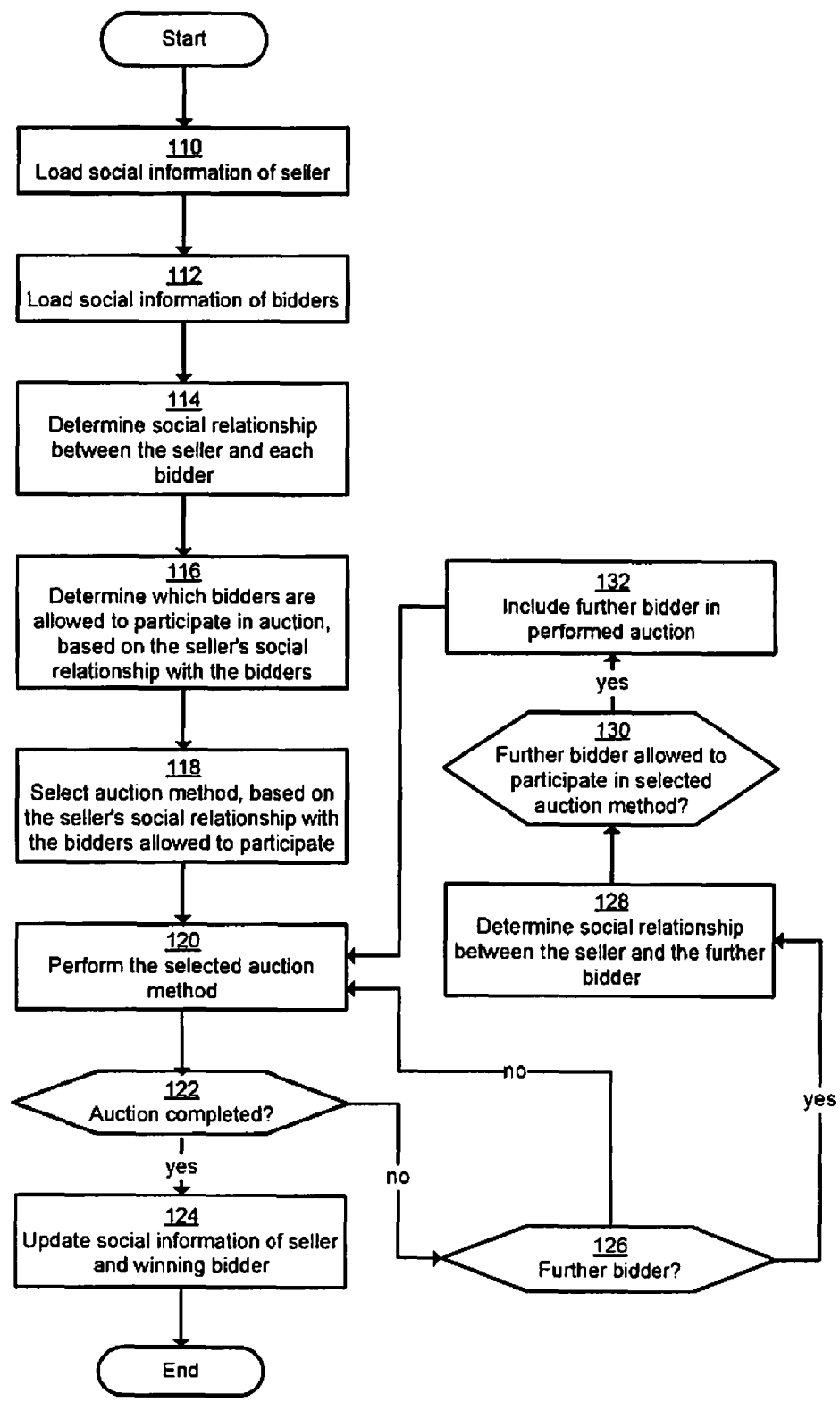
FIG. 1 is flow diagram of an embodiment of the inventive method.
Figure 4:
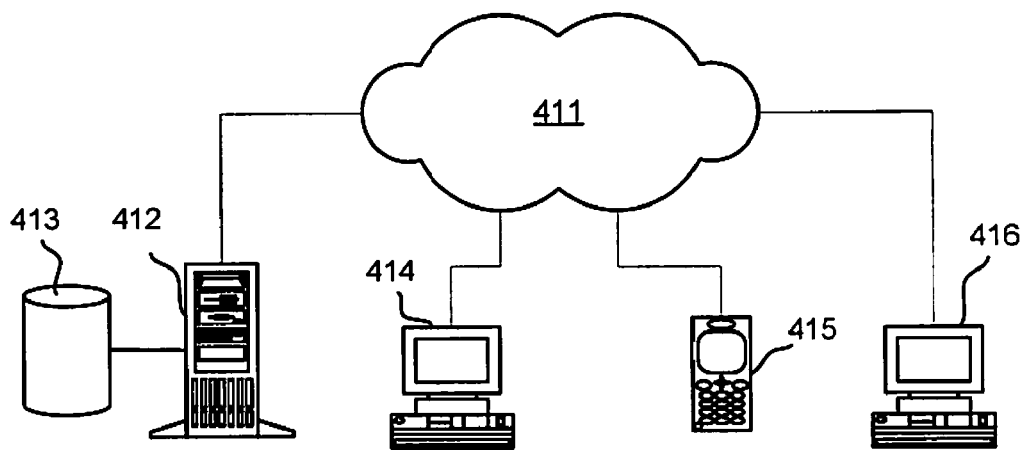
FIG. 4 illustrates a system implementing the method.

With reference to FIG. 1 and FIG. 4, embodiments of the inventive method and system are illustrated. The first step of the method (not illustrated) consist of uploading on an auction server 412 an item to be auctioned and registering on the auction server 412 the seller and any bidders. This is done in any suitable know way, for instance by using the HTTP POST method for inserting a description of the item into a database 413 connected to a web server, i.e. to the auction server 412. The auction server 412 is then used to expose database information for a user that has been registered by using the HTTP POST method or similar method and authenticated by using the HTTP Digest access authentication mechanism. This means that the user has been registered in an access control system associated with the auction server 412 prior inserting the description of the item. Connected to the auction server 412 is the database 413, which can be implemented on the same computer as the action server 412 or I a separate computer which is connected to the auction server 412 via network 411. Preferably the database 413 also stores social information in the form of social connections of users that may act as both sellers and bidders, and the social information is inserted and stored in the database 413 by a computer program that extracts and stores relevant data from/in the database.

The seller registers and uploads the items by using the HTTP POST method as previously described, by using a client 414 having implemented thereon a client computer program for performing these steps. The client may be a personal computer, a portable digital assistant or a mobile station. The uploading of the item includes presenting a set of forms which the user fills in to create the information to be submitted, and then using the HTTP POST method to input his information into the database 413 via the auction server 412 that is used to expose and present the information via the network.

For registering to the auction the bidders use a respective client 415, 416, e.g. by using the HTTP POST method for inputting their information into the database 413 via the auction server 412, which is done in a way similar with the sellers inputting of information. Communication between the auction server 412 and the clients 414, 415, 416 is set up in a conventional manner known within the art and is done via a network 411 such as the Internet, for example by using the HTTP protocol or other similar protocols. Additional to the HTTP protocol, the SIP protocol can be used, e.g. the SUBSCRIBE method of the SIP protocol may be used to register interest while the NOTIFY method may be used to receive updates concerning bids and items for sale.

On the auction server 412 social information comprising connections of the seller is loaded 110 from the database 413 or, optionally, loaded via the client 414 or the seller. On the auction server 412 social information comprising connections of each bidder is also loaded 112 from the database 413 or, optionally., loaded via the clients 415, 416 of the bidders.

Figure 5:
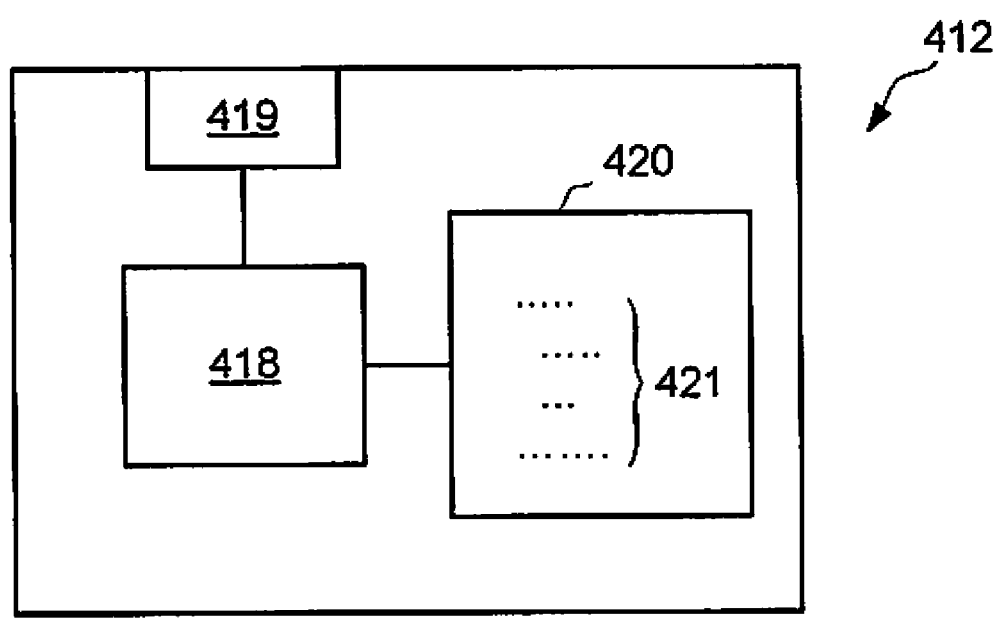
FIG. 5 is a schematic view of an auction server.

With reference to FIG. 5, the auction server 412 is illustrated in more detail and comprises a processor 418 which is connected to a computer readable medium 420 having stored thereon a computer program 421. The computer program 421 comprises software instructions for causing the auction server 412 to make the method steps performed by the auction server 412 for the online auction system described herein. A communications interface 419 is also connected to the processor 418 for providing communication with the network 411 and, optionally, the database 413.

Once the social information is loaded the social relationship between the seller and each bidder is determined 114. The social information is typically comprised in or represented by a social network which is social structure made of nodes that are tied by one or more specific types of interdependency, such as but not limited to values, visions, ideas, financial exchange, friendship, kinship, dislike, conflict, geographical nearness, membership, employer, business area, profession or trade. The social information may also comprise presence information of a presently (the seller or any of the bidders), which information is retrievable from commercial presence systems.

Many various ways exist to relate the nodes in the social network, which reflect the ways which humans can be relate. How the social relationship may be determined is more specifically elucidated below, but in general social networks are typically implemented in computer system, e.g. the information about the nodes in the social network are stored in databases connected to servers which user computer programs to express the relationships between the nodes in the social network. For implementing a social network and perform calculations thereon a dedicated database program or separate programs is a separate processor are used.

Next it is determined 116 if the social relationship between a bidder and the seller is strong enough to allow the bidder to participate in the auction. Bidders with too weak relationship with the seller are then completely excluded, or excluded form certain types of auction methods. After this an auction method is selected 118, based on the sellers social relationship with the bidders. In one embodiment, a type of auction method is selected based on the social relationship the seller has with the bidder with the weakest social connection (to the seller).

The selected auction method is preferably a know auction method and the auction is then performed 120 according to its mechanism. The implementation of the selected auction method is in this embodiment the auction server 412 with the computer program 421 executed on the auction server 412, which receives bids and matches them against the items, and depending on the auction mechanism determines which items should be sold to which bidder. The auction method can be implemented in a database, where said auction method correlates the bidders and sellers and by measures the bids against each other an the items and determines the outcome.

As an example of an auction method an English auction is used. In this type of auction, one item is for sale and bidders compete by offering subsequently higher bids for the items until one bidder offers a bid so high that no other bidders is willing to continue bidding. This can be implemented as a computer program, e.g. a module of the computer program 421, working with a database of bidders in the following way: as the bidders have registered in the database, when the auction is started, a message is sent to all bidders of the current bid; if they wish to register a higher bid, they can do so, e.g. by the previously mentioned HTTP POST method to input their bids into a database; the database registers the level of the bids and the time, sends an updated current bid to the bidders which then may place a new bid an so on; and when no bidder offers a higher bid than the last bidder, the auction is concluded.

Once the auction is determined 122 complete the social information of both the seller and the winning bidder is updated 124 in accordance with the subsequent transaction of the auction items and the winning bid, typically by creating a tie between a node of the seller and a node of the winning bidder if the subsequent transaction was conducted in a correct manner. In this case the created tie represent a successful transaction of an items in exchange of a winning bid.

During the performance 120 of the auction method, it is substantially continuously or at regular time intervals evaluated 126 if a further bidder would like to participate in the ongoing auction. If this is the case, the social relationship between the seller and the further bidder is determined 128 and it is determined 130 if the further bidder is allowed to participate in the performed auction. In this case social relationship and allowance to participate is determined in a manner corresponding to the determination for the original bidders. However, in this case the type of auction method that is performed is preferably not changed. If the further bidder is allowed to participate the bidder is included 132 in the ongoing auction and is allowed to place a bid.

Figure 2:
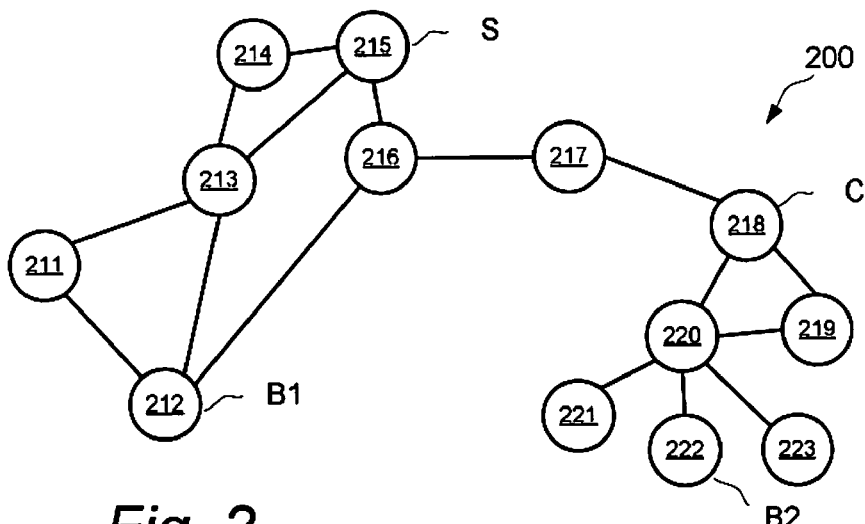
FIGS. 2 and 3 are schematic views of social graphs.
Figure 3:
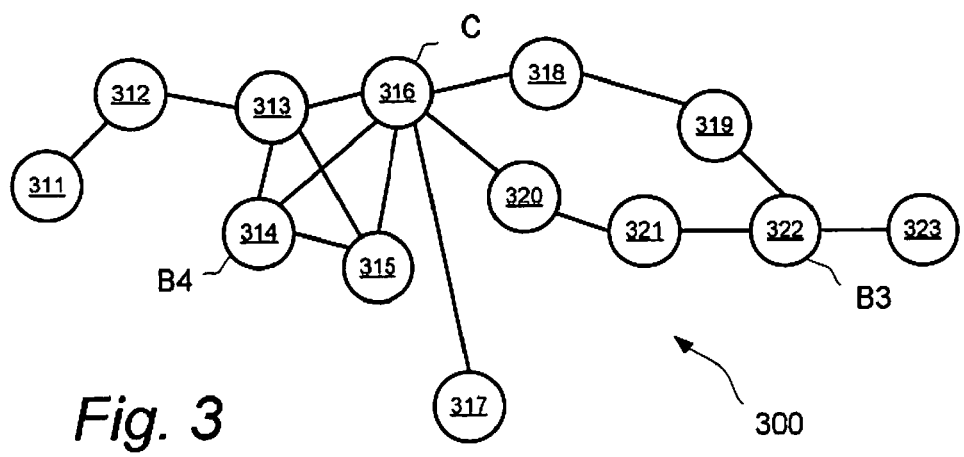

As examples, social networks 200, 300 of two persons are illustrated in FIG. 2 and FIG. 3. Here persons are represented by nodes 211-223 and 311-323 which are connected by ties, or connections (the lines between the nodes), that represent relationships between the persons. The seller S, to which the first social network 200 belongs, is represented by the node 215 while the first bidder B1 and the second bidder B2 are represented by the nodes 212 and 222. A third bidder B3 to which the second social network 300 belongs, is represented by the node 322 while a further bidder B4, i.e. a bidder not participating from the very start of the auction, is represented by the node 314.

the nodes 218 and 316 represent the same person, or a so called common person C, even if the first network 200 is not tied to the second network 300. This case may occur if the ties in the networks 200, 300 does not represent the same type of relationship.

The network of a person is created in a suitable manner know within the art. This means that the network may eventually be retrieved from existing networks like MySpace Facebook, StudiVZ, CoachSurfing, Friendster, Orkout, LinkedIn, Plaxo etc.

The relationship between the seller and bidders are determined by calculating metrics known within the field of network analysis. This is a field of mathematics describing the relationships between nodes in a network. Regarding the social network, it can be expressed as the graph 200 or 300 which in one dimension show the relationship between the nodes 211-233 and 311-323. To determine the distance, which is a measure of the distance between two nodes and hence the social distance between individuals representing the two nodes, the smallest possible number of nodes via any other node is determined. In the graph 200, the distance between node 211 and node 233 is 7 whereas the distance between node 216 and node 217 is 1.

Closeness may also be taken into account, which is the degree a person (node) is near all other persons in a network (directly or indirectly). It reflects the ability to access information through the "grapevine" of network members. Thus, closeness is the inverse of the sum of the shortest distances between each individual and every other person in the network.

Other metrics such as betweeness, centrality, flow betweeness centrality, eigenvector centrality, centralization, clustering coefficient, cohesion, density, path length, radiality, reach, structural cohesion and/or structural equivalence may also be determined and optionally weighted to determine the social relationships. The measurement of each relationship is a numerical value which is compared to a set of range of values where each range of values represents an auction method. Each auction method has a trust classification ranking the auction method from high-trust to low-trust.

The social relationship that has a calculated value falling within the range of values of the auction method having the lowest trust classification determines which auction method shall be used, i.e. the one with the lowest trust is used.

The available auction methods includes for example open ascending price auction (English auction), open descending price auction (Dutch auction), first-price sealed-bid auction (sealed first-price auction), sealed-bid second-price auction (Vickery auction), as well as buyout auction, combinatorial auction, reserve auction, no-reserve auction, reverse auction and walrasian auction.

With reference to the social graphs 200, 300, the closest social relationship between the seller S and the first bidder B1 may be expressed as two, as the lowest number of ties, or connections, between the node 212 of B1 and the node 215 of S is two (either via the node 213 or the node 216). On other words, the social relationship between S and B1 is represented by the value 2. Correspondingly, the social relationship between the seller S and the seller S and the second bidder B2 is calculated to five while the social relationship between the seller S and the third bidder B3 is calculated to six, having in regard that node 218 and node 316, as explained below, may be treated as equivalent nodes representing the same person.

To conclude that the nodes 218 and 316 represent the same person, data such as name including any social community nickname and contact information, e.g. e-mail address, postal address, telephone no. pertaining to the nodes 218, 316 was compared, and since the data in the nodes 218, 316 was found similar it was concluded that the nodes 218 and 316 represent a common person C. This means that the node 218 in network 200 is treated as being connected to nodes 313, 314, 315, 317 320 and 318 in network 300, while node 316 is network 300 is being treated as being connected to nodes 217, 219 and 220 in network 200.

When the number of ties are determined fore each bidder, the smallest possible number of ties between the seller and the bidder is used.

In this numerical example it has been manually determined, e.g. by the auctioneer or any other party responsible for setting the numerical value of the level of trust, that a high-trust auction is a Dutch auction which requires a social relationship value of one to four, i.e. there may not be more than one to four ties between the node of the seller and the node of the most distant bidder. It has also been determined that a low-trust auction is an open call auction which is used for social relationships having a social relationship value higher than four. Hence, in this example, the low-trust auction is used since the most distant social relationship value is six, which value is determined by the number of ties between the bidder B3 most distant fro the seller S.

The social information may be included not only in the exemplified social graph but in any topological graph that includes social connections between nodes that represent individuals or organizations. As an example, the social information could be extracted from operator data e.g. call detail records (CDR's), in which case a topological graph can be calculated from the CDR-data.

As described, the method may be implemented on one server but the steps of the method may be performed on different servers without departing from the scope of the invention, e.g. the step of determining values representing a relationship between the seller the bidders may be done on a first server, while the step of performing the auction method is performed on a second server. It may even be that one of the clients acts as a server, for example if the auction method is loaded as an applet in one of the clients and then executed on that client.

Although various embodiments of the invention have been described and shown, the invention is not restricted thereto, but may also be embodied in other ways within the scope of the subject-matter defined in the following claims. In particular, the invention may be implemented on any suitable platform, such as on a IP Multimedia Subsystem which has been standardized by the 3rd Generation Partnership Project, or may be implemented on Web Services System were communication typically takes place as HTTP messages that are based on SOAP protocols.

What is claimed is:

1. A method for an online auction system, performed by computer software embodied on a non-transitory computer readable medium and executed by a processor on at least one computer server and comprising the steps of:

determining values representing a relationship between a seller and a plurality of bidders, based on social connections of the seller and social connections of the bidders, selecting an auction method based on the values representing a relationship between the seller and the bidders, and performing the selected auction method, for purpose of selling an item of the seller at a winning bid quoted by any of the bidders, wherein the step of performing the selected auction method further comprises:

determining a value representing a relationship between the seller and a further bidder, based on the social connections of the seller and social connections of the further bidder, and allowing or denying the further bidder to participate in the performing of the selected auction method, based on the value representing a relationship between the seller and the further bidder.

2. An online auction system comprising computer software embodied on a non-transitory computer readable medium and executed by a processor on at least one computer server, the system being configured to:

determine values representing a relationship between a seller and a plurality of bidders, based on social connections of the seller and social connections of the bidders, select an auction method based on the values representing a relationship between the seller and the bidders, and perform the selected auction method, for purpose of selling an item of the seller at a winning bid quoted by any of the bidders, the system further configured to, when the selected auction method is performed, determine a value representing a relationship between the seller and a further bidder, based on the social connections of the seller and social connections of the further bidder, and allow or deny the further bidder to participate in the performing of the selected auction method, based on the value representing a relationship between the seller and the further bidder.

* * * * *

UNITED STATES PATENT AND TRADEMARK OFFICE
CERTIFICATE OF CORRECTION

| | |
|---|---|
| PATENT NO. | : 7,827,073 B2 |
| APPLICATION NO. | : 12/243351 |
| DATED | : November 2, 2010 |
| INVENTOR(S) | : Hjelm et al. |

It is certified that error appears in the above-identified patent and that said Letters Patent is hereby corrected as shown below:

In Column 1, Line 5, delete "from" and insert -- for --, therefor.

In Column 1, Line 13, delete "items(s)" and insert -- item(s) --, therefor.

In Column 1, Line 26, delete "an pricing" and insert -- a pricing --, therefor.

In Column 1, Line 31, delete "compatibility prices" and insert -- compatibly priced --, therefor.

In Column 1, Line 33, delete "compatibility" and insert -- compatibly --, therefor.

In Column 1, Line 37, delete "designates" and insert -- designate --, therefor.

In Column 1, Line 41, delete "items" and insert -- item --, therefor.

In Column 1, Line 44, delete "auctions" and insert -- auction --, therefor.

In Column 1, Line 53, delete "items" and insert -- item --, therefor.

In Column 1, Line 57, delete "know" and insert -- known --, therefor.

In Column 1, Line 58, delete "persona re" and insert -- person are --, therefor.

In Column 2, Line 10, delete "connection" and insert -- connections --, therefor.

In Column 2, Line 18, delete "reason," and insert -- reasons, --, therefor.

In Column 2, Line 25, delete "independence" and insert -- in dependence --, therefor.

In Column 2, Line 41, delete "that a" and insert -- that --, therefor.

In Column 2, Line 59, delete "connection" and insert -- connections --, therefor.

In Column 3, Line 15, delete "is a" and insert -- in a --, therefor.

Signed and Sealed this
Twenty-sixth Day of April, 2011

David J. Kappos
*Director of the United States Patent and Trademark Office*

CERTIFICATE OF CORRECTION (continued)
U.S. Pat. No. 7,827,073 B2

In Column 3, Line 42, delete "connections." and insert -- (connections). --, therefor.

In Column 3, Line 49, delete "mechanism." and insert -- mechanism, --, therefor.

In Column 3, Lines 64-65, delete "and online auctions" and insert -- an online auction --, therefor.

In Column 3, Line 65, delete "configures" and insert -- configured --, therefor.

In Column 4, Line 7, delete "provided" and insert -- provided, --, therefor.

In Column 4, Line 9, delete "action" and insert -- auction --, therefor.

In Column 4, Line 18, delete "the" and insert -- The --, therefor.

In Column 4, Line 19, delete "configures" and insert -- configured --, therefor.

In Column 4, Line 22, delete "as" and insert -- and --, therefor.

In Column 4, Line 27, delete "the way" and insert -- way --, therefor.

In Column 4, Line 29, delete "is" and insert -- is a --, therefor.

In Column 4, Line 39, delete "step" and insert -- steps --, therefor.

In Column 4, Line 43, delete "know" and insert -- known --, therefor.

In Column 4, Line 54, delete "action server 412 or I a" and insert -- auction server 412 or in a --, therefor.

In Column 4, Line 55, delete "via" and insert -- via a --, therefor.

In Column 4, Line 62, delete "items" and insert -- item --, therefor.

In Column 5, Line 21, delete "or" and insert -- of --, therefor.

In Column 5, Line 24, delete "optionally.," and insert -- optionally, --, therefor.

In Column 5, Line 38, delete "is" and insert -- is a --, therefor.

In Column 5, Line 44, delete "presently" and insert -- presentity --, therefor.

In Column 5, Line 48, delete "relate." and insert -- related. --, therefor.

In Column 5, Line 51, delete "system," and insert -- systems, --, therefor.

In Column 5, Line 53, delete "user" and insert -- use --, therefor.

In Column 5, Line 57, delete "is" and insert -- in --, therefor.

In Column 6, Line 1, delete "know" and insert -- known --, therefor.

CERTIFICATE OF CORRECTION (continued)
U.S. Pat. No. 7,827,073 B2

In Column 6, Line 7, delete "items" and insert -- item --, therefor.

In Column 6, Line 11, delete "an the items" and insert -- and the item --, therefor.

In Column 6, Line 14, delete "items" and insert -- item --, therefor.

In Column 6, Line 15, delete "bidders" and insert -- bidder --, therefor.

In Column 6, Line 30, delete "the" and insert -- a --, therefor.

In Column 6, Line 31, delete "items" and insert -- item --, therefor.

In Column 6, Line 34, delete "represent" and insert -- represents --, therefor.

In Column 6, Line 35, delete "items" and insert -- item --, therefor.

In Column 6, Line 56, delete "B3" and insert -- B3, --, therefor.

In Column 6, Line 61, delete "the nodes" and insert -- The nodes --, therefor.

In Column 6, Line 67, delete "know" and insert -- known --, therefor.

In Column 7, Line 1, delete "MySpace" and insert -- MySpace, --, therefor.

In Column 7, Line 2, delete "Orkout," and insert -- Orkut, --, therefor.

In Column 7, Line 4, delete "relationship" and insert -- relationships --, therefor.

In Column 7, Line 11, delete "211-233" and insert -- 211-223 --, therefor.

In Column 7, Line 16, delete "233" and insert -- 223 --, therefor.

In Column 7, Line 17, delete "217" and insert -- 217 node --, therefor.

In Column 7, Line 25, delete "as betweeness," and insert -- as betweenness, --, therefor.

In Column 7, Lines 25-26, delete "betweeness" and insert -- betweenness --, therefor.

In Column 7, Line 43, delete "(Vickery" and insert -- (Vickrey --, therefor.

In Column 7, Line 54, after "between" delete "the seller S and".

In Column 7, Line 67, delete "317" and insert -- 317, --, therefor.

In Column 8, Line 1, delete "316 is" and insert -- 316 in --, therefor.

In Column 8, Line 4, delete "fore" and insert -- for --, therefor.

In Column 8, Line 19, delete "fro" and insert -- from --, therefor.

In Column 8, Line 44, delete "Web" and insert -- a Web --, therefor.